(12) United States Patent
Tidwell

(10) Patent No.: US 7,413,089 B1
(45) Date of Patent: Aug. 19, 2008

(54) REUSABLE CARTRIDGE OIL FILTER

(75) Inventor: Kelly Tidwell, Huntington Beach, CA (US)

(73) Assignee: Pure Power! Incorporated, Huntington Beach, CA (US)

( * ) Notice: Subject to any disclaimer, the term of this patent is extended or adjusted under 35 U.S.C. 154(b) by 104 days.

(21) Appl. No.: 10/728,060

(22) Filed: Dec. 4, 2003

(51) Int. Cl.
*B01D 27/00* (2006.01)
*B01D 27/10* (2006.01)
*B01D 27/06* (2006.01)

(52) U.S. Cl. .................. 210/443; 210/130; 210/232; 210/450; 210/451; 210/453; 210/455; 210/493.1; 210/493.2; 210/494.2; 210/499; 210/DIG. 17

(58) Field of Classification Search .......... 210/130, 210/232, 443, 450, 451, 453, 455, 493.1, 210/493.2, 494.2, 499, DIG. 17
See application file for complete search history.

(56) References Cited

U.S. PATENT DOCUMENTS

| | | | |
|---|---|---|---|
| 2,966,990 A | | 1/1961 | Sicard |
| 3,232,437 A | | 2/1966 | Hultgren |
| 3,283,902 A | | 11/1966 | Farris et al. |
| 3,315,809 A | | 4/1967 | Hultgren |
| 3,526,590 A | | 9/1970 | Russo |
| 4,622,136 A | | 11/1986 | Karcey |
| 4,872,976 A | | 10/1989 | Cudaback |
| 5,066,391 A | * | 11/1991 | Faria ............................ 210/85 |
| 5,548,893 A | | 8/1996 | Koelfgen |
| 5,569,373 A | * | 10/1996 | Smith et al. .................... 210/90 |
| 5,679,244 A | * | 10/1997 | Tettman et al. ............... 210/130 |
| 5,711,872 A | | 1/1998 | Jones et al. |
| 5,888,383 A | * | 3/1999 | Cox ............................ 210/130 |
| 6,024,229 A | | 2/2000 | Ayers |
| 6,068,763 A | * | 5/2000 | Goddard ...................... 210/130 |
| 6,086,763 A | | 7/2000 | Baumann |
| 6,221,242 B1 | * | 4/2001 | Deibel et al. ................. 210/133 |
| 6,228,274 B1 | | 5/2001 | Deibel et al. |
| 6,381,983 B1 | | 5/2002 | Angelo et al. |
| 6,554,139 B1 | | 4/2003 | Maxwell et al. |
| 6,568,539 B1 | | 5/2003 | Deibel et al. |
| 6,716,361 B2 | | 4/2004 | Deibel et al. |
| 2003/0106848 A1 | * | 6/2003 | Oohashi et al. ............. 210/130 |

OTHER PUBLICATIONS

Oiltech, The Spinner II Cleanable Screen Product Information and Application Chart, 2 pgs, undated.
Oiltech, "Why must the Spinner II's Cleanable screen be used with a Spinner II centrifuge?", 2 pgs, undated.
System 1 Filter Products, "The Leader in High Technology Engine Filtration", pp. 1-4, 6-7, undated.

* cited by examiner

*Primary Examiner*—John Kim
(74) *Attorney, Agent, or Firm*—Blakely Sokoloff Taylor & Zafman LLP

(57) ABSTRACT

A replacement filter for conventional throw-away spin-on oil filter cartridge on an internal combustion engine. The replacement filter uses a porous metallic filter element, preferably a woven stainless steel, pleated filter element, within a housing physically simulating the conventional throw-away spin-on oil filter cartridge. The housing is disassembleable, typically by unscrewing the top cap of the housing, for removal, cleaning and reuse of the filter element. This avoids the problems of cost and availability of replacement filters and of disposal of used filters. Various embodiments are disclosed.

8 Claims, 5 Drawing Sheets

REUSABLE CARTRIDGE OIL FILTER

BACKGROUND OF THE INVENTION

1. Field of the Invention

The present invention relates to the field of oil filters, and more particularly to oil filters as are frequently used on internal combustion engines.

2. Prior Art

Internal combustion engines, including gasoline and diesel engines as are commonly used in cars, trucks, boats and stationary power plants, frequently use a canister type oil filter for filtering the crankcase oil as it circulates through the pressure lubrication system. A typical filter of this type may be seen in FIG. 1. Such filters are characterized by a can-like housing 20 with a top cap 22 permanently attached thereto having an internally threaded center region or hub 24, openings 26 and a flat rubber seal 28. Within the can-like housing 20 and separating the center region in communication with the opening through hub 24 and the outer region in communication with the openings 26 is a pleated paper filter material through which oil may pass. In use, the threaded center hub 24 threads onto a short threaded pipe on the oil filter mount on the engine until rubber member 28 seals against a flat surface on the oil filter mount. Porting adjacent the short threaded pipe-like protrusion on the oil filter mount provides oil communication with the openings 26. Normally oil flow is through the openings 26, through the paper filter and then out through the threaded pipe-like structure threaded into hub 24.

Filters of the type shown in FIG. 1 have the primary advantage of being easily replaced by simply unscrewing the used filter and screwing a replacement filter back on. However, they also have certain disadvantages, since not only is the filter element (the paper filter) effectively replaced on each oil change, but the pressure container in which the filter element is mounted is also replaced on each oil change. Consequently, the cost of these filters substantially increases the cost of the oil change itself. Further, because of the wide variety of filter sizes, a substantial number of filters must be inventoried to have an adequate supply of the various sizes that may be required. Also, the filtering of the paper is less than ideal, the paper catching only a percentage of particles of a given size, with the paper clogging over time so that increasing percentages of the recirculating oil bypasses the filter entirely.

While filters of the foregoing type are easily removed from an engine and replaced with a new filter, the used filter is not easily disposed of. Being toxic, the used filter cannot simply be thrown out, so to speak, as before, but rather must be disposed of using prescribed and relatively expensive procedures. Consequently, there is room for improvement in both the performance and the economics of internal combustion engine oil filters.

DETAILED DESCRIPTION OF THE PREFERRED EMBODIMENTS

Figure 1:
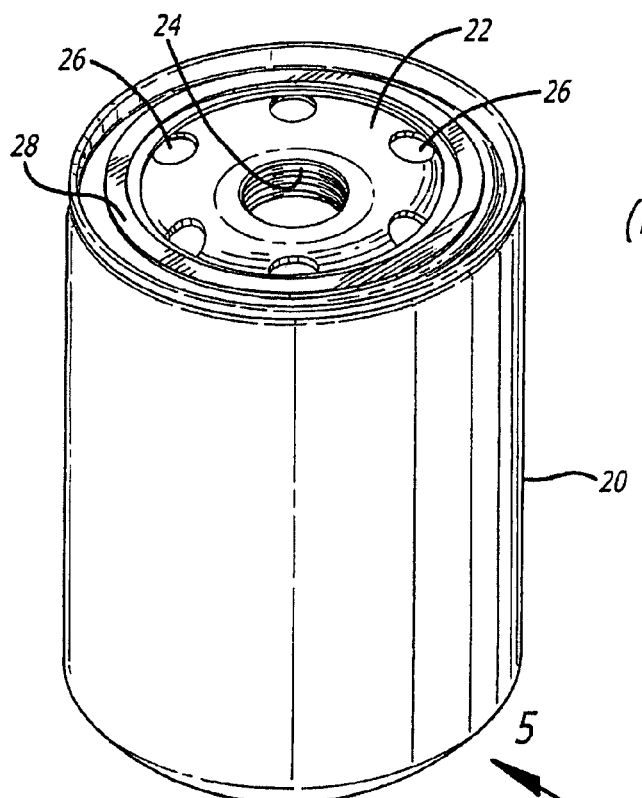
FIG. 1 is a perspective view of a representative prior art conventional throw-away spin-on oil filter cartridge as used on many internal combustion engines.
Figure 2:
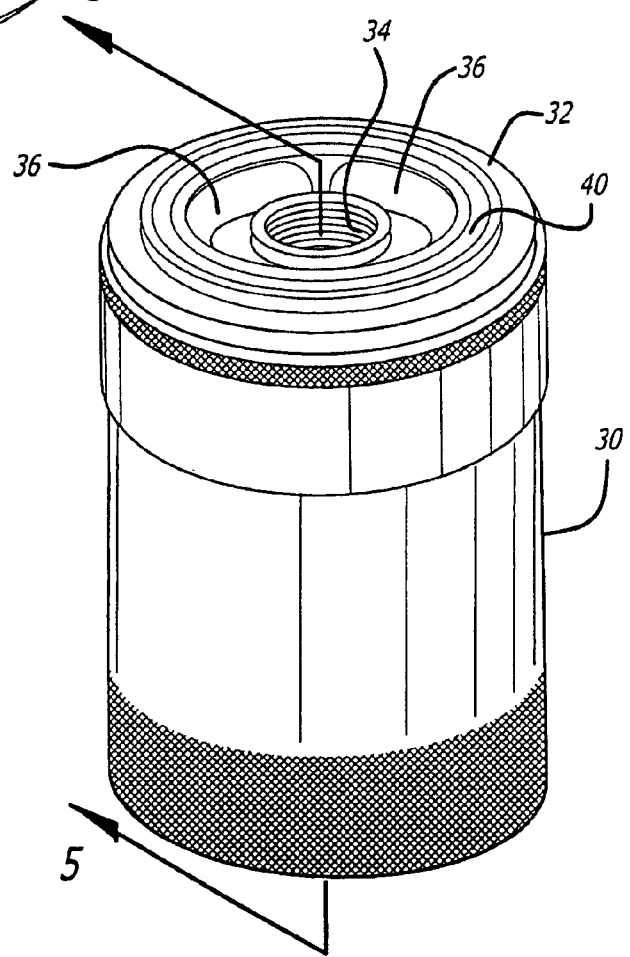
FIG. 2 is a perspective view of one embodiment of replacement filter cartridge as may be used for replacement of the filter cartridge of FIG. 1.

First referring to FIG. 2, a perspective view of one embodiment of the present invention may be seen. The filters and methods of the present invention are intended to provide a direct replacement for the prior art filters of the type shown in FIG. 1, and accordingly may be substituted for such prior art filters with absolutely no change to the internal combustion engine itself, and more particularly, with no change to the oil filter mount. Thus, the filter shown in FIG. 2 has a physical appearance very similar to that of the prior art filter of FIG. 1, being characterized in appearance by a can-like housing 30 and a top cap 32, having an internally threaded central hub 34 and openings 36 through the top cap 32 within the periphery of a rubber or elastomeric seal ring 40. However, internally the oil filters of the present invention are very different from the prior art, as may be seen in FIGS. 3 and 4.

Figure 3:
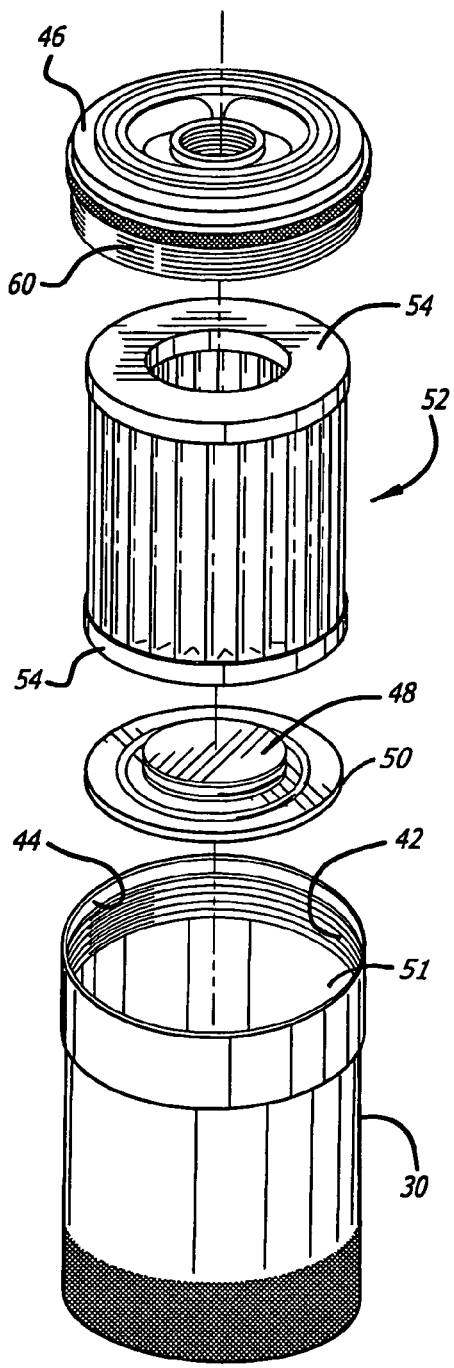
FIG. 3 is an exploded perspective view of the filter cartridge of FIG. 2.
Figure 4:
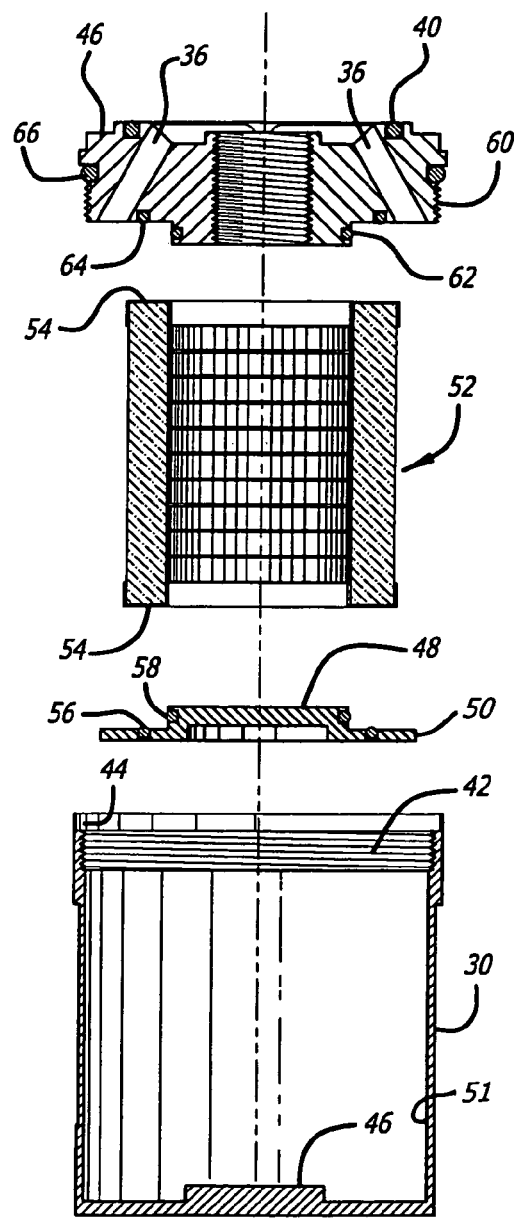
FIG. 4 is an exploded cross section of the filter cartridge of FIGS. 2 and 3.

FIG. 3 presents an exploded perspective view of the embodiment of FIG. 2, with FIG. 4 presenting an exploded cross-sectional view of the filter of FIGS. 2 and 3. The can-like housing 30 in this embodiment has an internally threaded region 42 adjacent its open top, with a top land 44 which, as shall subsequently be seen, provides a cylindrical sealing surface for an o-ring seal on the top cap, generally indicated by the numeral 46. The can-like housing 30 in this embodiment also has a raised center region 46 at the bottom thereof that receives and holds concentric a seal plate 48. Alternatively, the seal plate 48 could locate on its outer diameter 50 on the inner periphery 51 of the can-like housing 30.

The filter cartridge itself, generally indicated by the numeral 52, is a stainless steel woven mesh which is pleated, formed into the cylindrical shape, the mating edges welded, and then cemented in upper and lower stainless steel cup-like members 54 with epoxy to form an integral and durable filter assembly. In that regard, woven stainless meshes are commercially available in the desired porosity ranges. They capture a larger percentage of particles larger than their rated porosity and do not clog as readily as paper filter materials do.

With the seal plate 48 positioned in the can-like housing 30 with filter element 52 also in position in the can-like housing 30, the bottom cup 54 will seal on its bottom against an o-ring seal 56 and a second o-ring seal 58 to prevent unfiltered oil from passing around the inner end of the filter. The entire assembly is held together by top cap 46, having external threads 60 thereon for threading into threaded region 42 at the top of the can-like housing 30. Top cap 46 in this embodiment includes O-ring seals 62 for sealing against the inner periphery of the filter element 52, face o-ring seal 64 for sealing against the top surface of member 54 on filter 52, O-ring 66 for sealing against the cylindrical lip 44 of can-like structure 30, and finally, an O-ring 40 (see also FIG. 2) for sealing against the oil filter mount on the internal combustion engine like the rubber or elastomeric ring 28 of the prior art (FIG. 1).

Figure 5:
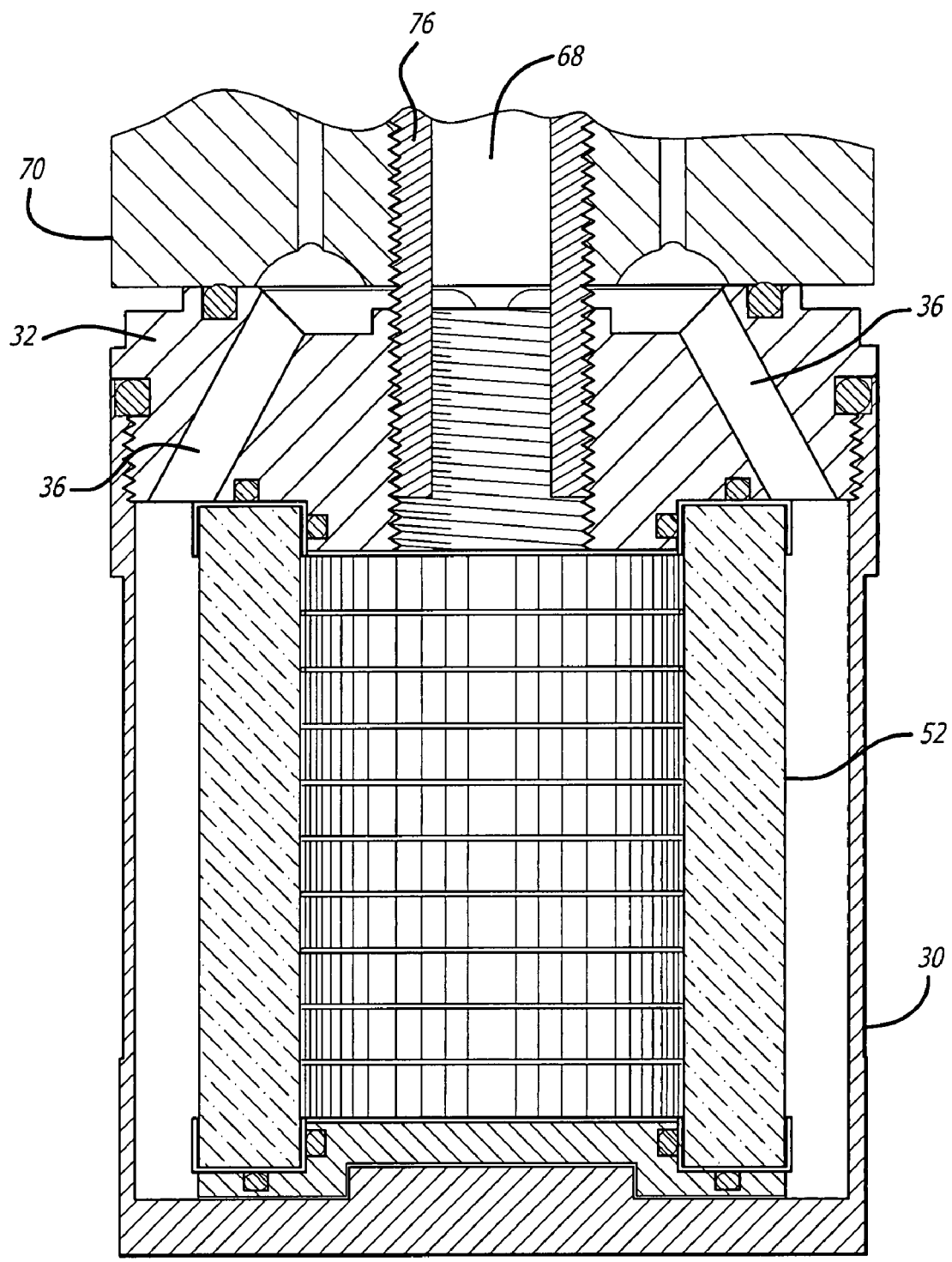
FIG. 5 is a cross section of the filter cartridge of FIGS. 2, 3 and 4.

A cross-section of the final assembly may be seen in FIG. 5. As shown therein, the filter element 52 is sealed at the top and bottom so that oil flow between openings 36 and the central region 68 must necessarily pass through the metal filter. In any specific filter configuration, the proportions will change to simulate the prior art filter it replaces and various design details may change as desired, though an essential feature of the present invention is the ability to remove the metal filter for cleaning and reuse. In that regard, being able to disassemble the filter cartridge allows the rapid removal of oil therefrom, with the metal filter element itself not retaining much oil. The entire filter assembly is preferably removed from the oil filter mount 70 for disassembly by unscrewing the entire assembly from the threaded member 76, cleaning and reassembly and remounting, though if desired, the cap 32 could be left mounted, and only the can-like housing and filter element 52 removed from the engine for cleaning and replacement. The filter element, being metal, may readily be cleaned with an appropriate solvent or even cleaned with soap and water and reused indefinitely. This, of course, eliminates the new filter stocking requirements, the old filter disposal problems and the costs associated with both, providing highly reliable, high quality oil filtration. In that regard, while sintered metal filter elements could be used, the woven wire mesh is preferred as not being so easily clogged, as being more easily cleaned, and in general presenting a substantially larger filter area for a given size filter cartridge by pleating.

Figures 7, 8:
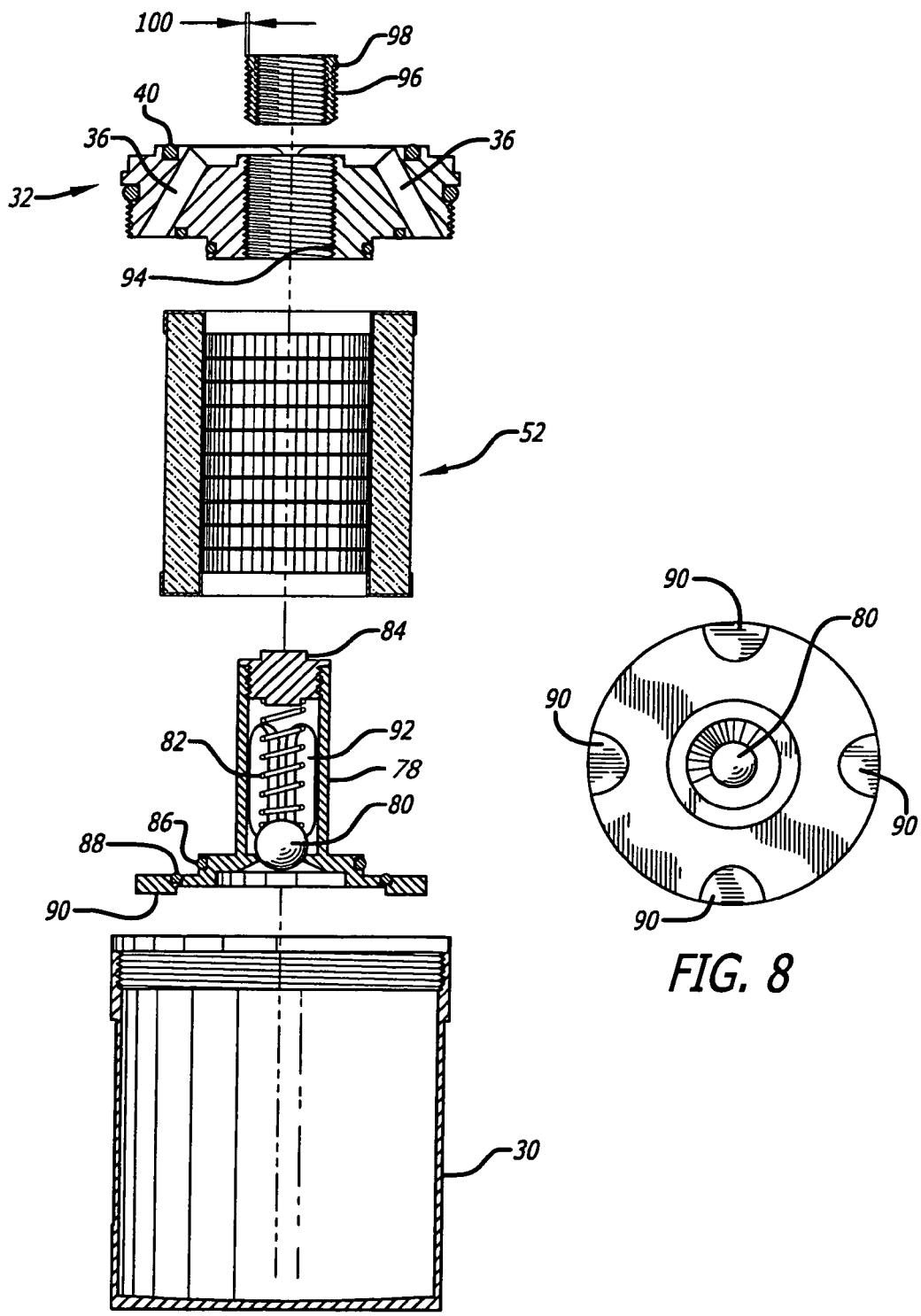
FIG. 7 is an exploded cross section of an alternate embodiment filter cartridge incorporating a bypass valve.
FIG. 8 is a plan view showing the feet on the bypass valve housing.

Now referring to FIG. 7, an exploded cross section of an alternate embodiment filter in accordance with the present invention incorporating a bypass valve may be seen. In this embodiment, various parts may be identical or substantially identical in form and function to the parts of the embodiment of FIGS. 3 of 4, and accordingly, are given the same reference numerals. The difference in the embodiment of FIGS. 7 and 8, however, is the inclusion of a bypass valve body 78 having a ball 80 normally held against a valve seat by spring 82 acting between the ball and top closure member 84. The bypass valve body 78 has a lower flange thereon with O-rings 86 and 88 for sealing against the inner periphery and the face of the bottom end of filter element 52, with the flange having feet 90 adjacent the lower periphery thereof. The diameter of the flange is intentionally made less than the diameter of the can-like housing 30 so that when the various parts of the filter are assembled, there will be a good flow path for unfiltered oil through openings 36 around the outer periphery of the filter element 52, around the lower end of bypass valve housing 78 and between feet 90 to the lower side of the ball valve 80. Thus if filter element 52 becomes sufficiently dirty to unreasonably restrict the flow through the filter element, pressure will build up under ball 80 to above some predetermined pressure, causing ball 80 to rise against the force of spring 82, allowing flow through the valve seat, around ball 80 and through openings 92 in the bypass valve housing 78 and out through the center of top cap 32.

Another other feature of the embodiment of FIG. 7 is illustrated in that Figure. In particular, the threaded members, such as threaded member 76 (see FIG. 5), on various oil filter mounts are of different diameters and threads, but otherwise the filters are or may be the same, including the top seal 40. Accordingly, in accordance with this embodiment, the threaded opening 94 in top cap 32 is preferably made to fit the larger threaded members 76 on filter mounts, with one or more internally and externally threaded inserts 96 being provided to adapt the same filter cartridge assembly to other, smaller threaded members on filter mounts. Alternatively, the threaded opening 94 may be made even larger than on any suitable filter mounts so that inserts 96 may be provided for even the larger filter mounts. This would ensure a minimum wall thickness for all inserts 96, if any required insert otherwise would have too thin a wall.

The inserts 96 preferably have a short top region 98 of a somewhat larger diameter 100 than the internal threaded area 94 so that the insert 96 may be threaded into top cap 32, yet will not inadvertently thread through the top cap when the filter assembly is screwed onto the threaded member of a filter mount. In one embodiment, the external threads on insert 96 are made continuous, though are later upset so as to interfere with the threads on the threaded region 94.

Figure 6:
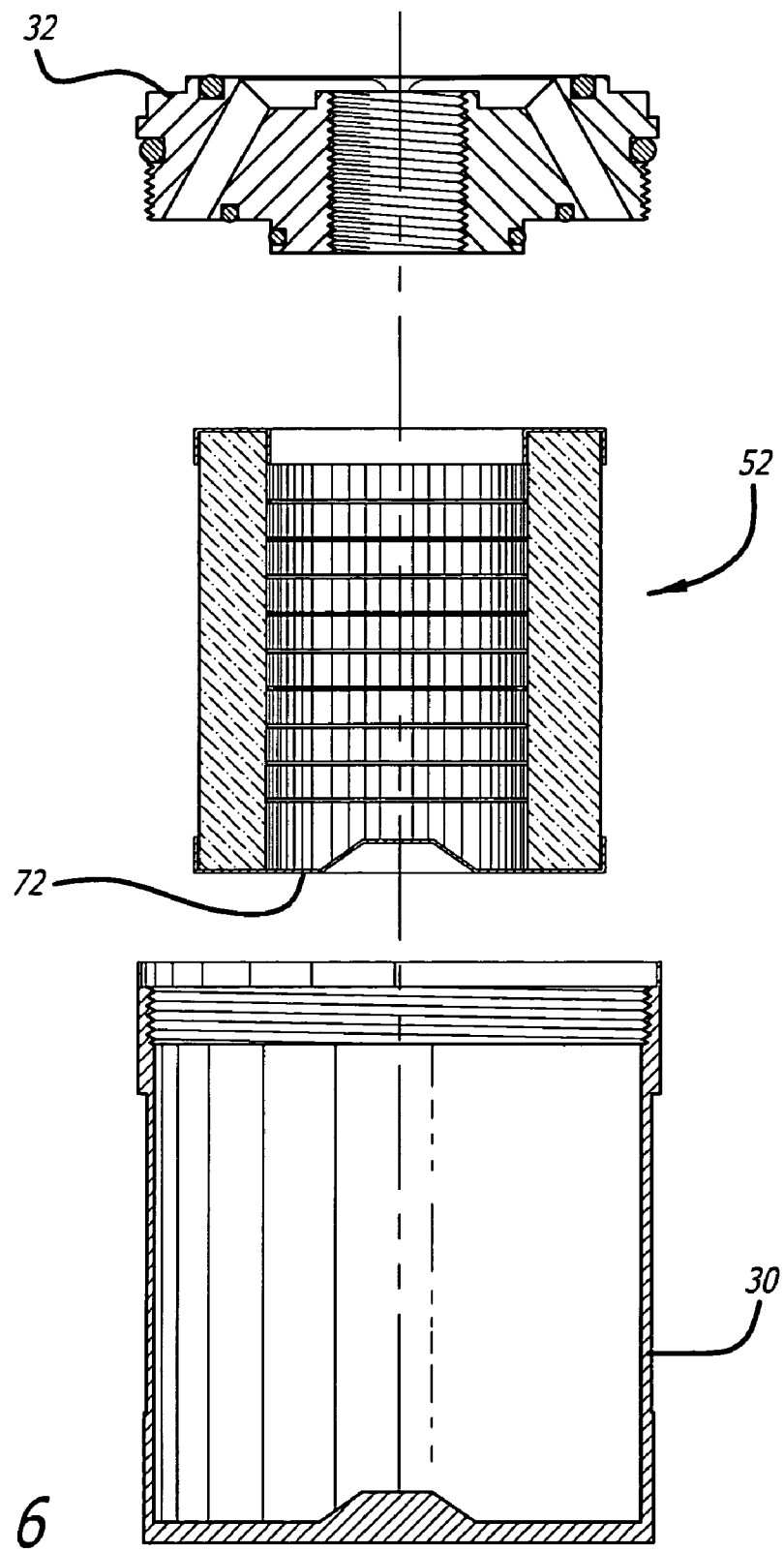
FIG. 6 is an exploded cross section of an alternate embodiment filter cartridge in accordance with the present invention.

As previously mentioned, various design details of the filter assembly of the present invention will vary, depending upon such factors as designer preferences, manufacturing ease, requirements of the filter to be replaced, etc. One such variation may be seen in FIG. 6, wherein the bottom cup-like member 54 of the embodiment of FIGS. 2, 3 and 4 is fabricated as a closed cup 72, providing a permanent seal at the bottom of the filter element and negating the need or desirability of a separate seal as shown in the embodiments of FIGS. 2, 3 and 4. This, of course, is but one variation in design, as many others will be apparent to those skilled in the art. By way of example, while the parts illustrated for the preferred embodiment, the housing may be a drawn can, the cap may be of an alternate fabrication, and/or the housing and cap may be an assembly of more than two parts. The seals may also be of alternate configurations. These and other modifications will be apparent to one skilled in the art, all within the full scope of the following claims.

What is claimed is:

1. A reusable filter for replacing a throw away filter for an internal combustion engine of the type having a filter cartridge, said reusable oil filter comprising, a can like housing, said can like housing having a closed bottom and an inside surface with internal threads, a filter cartridge, said filter cartridge having an upper cup like member and a lower cup like member and a pleated woven mesh stainless steel filter element, and a cap, said cap having an internally threaded central hub and at least two oil distribution channels, each oil distribution channel being in the form of an annular arc segment, each oil distribution channel having an inlet and an outlet, each inlet positioned substantially over upper cup like member and said filter cartridge, each outlet positioned outside said upper cup like member and said filter cartridge, each oil distribution channel extending continuously downwardly and radially outwardly to distribute oil to said inside surface of said can like housing, said distribution channels collectively occupying most of a full annular area and distributed around the internally threaded central hub for connecting to an internal combustion engine, said cap threadably connected to said can like housing to clamp said filter cartridge between said cap and said closed bottom without a spring.

2. The reusable filter of claim 1 wherein said cap further includes a seal ring, said seal ring positioned outside said inlets.

3. The reusable filter of claim 1 further comprising an O-ring seal between said cap and said upper cup like member.

4. The reusable filter of claim 1 further comprising an O-ring seal between said cap and said can like housing.

5. The reusable filter of claim 1 further comprising a raised center section on said closed bottom of said can like housing.

6. The reusable filter of claim 1 further including a bypass valve responsive to a predetermined pressure difference between an outer periphery and an inner periphery of the filter element to provide an oil flow path between the outer periphery and the inner periphery of the filter element when the pressure difference rises above the predetermined pressure difference.

7. The reusable filter of claim 1 further comprised of an internally and externally threaded insert fitting within an internally threaded central hub, whereby a specific reusable filter may be used on any of a plurality of engines having different oil filter mounts.

8. A reusable filter for replacing a throw away filter for an internal combustion engine of the type having a filter cartridge, said reusable oil filter comprising, a can like housing, said can like housing having a closed bottom and an inside surface with internal threads, a filter cartridge, said filter cartridge having an upper cup like member and a lower cup like member and a pleated woven mesh stainless steel filter element;

a bypass valve responsive to a predetermined pressure difference between an outer periphery and an inner periphery of the filter element to provide an oil flow path between the outer periphery and the inner periphery of the filter element when the pressure difference rises above the predetermined pressure difference;

a cap, said cap having an internally threaded central hub and at least two oil distribution channels, each oil distribution channel being in the form of an annular arc segment, each oil distribution channel having an inlet and an outlet, each inlet positioned substantially over upper cup like member and said filter cartridge, each outlet positioned outside said upper cup like member and said filter cartridge, each oil distribution channel extending continuously downwardly and radially outwardly to distribute oil to said inside surface of said can like housing, said distribution channels collectively occupying most of a full annular area and distributed around the internally threaded central hub for connecting to an internal combustion engine, said cap threadably connected to said can like housing to clamp said filter cartridge and said bypass valve between said cap and said closed bottom without a spring;

a seal ring on said cap positioned outside said inlets;

an O-ring seal between said cap and said upper cup like member, and an O-ring seal between said cap and said can like housing.

\* \* \* \* \*